Figure 1:
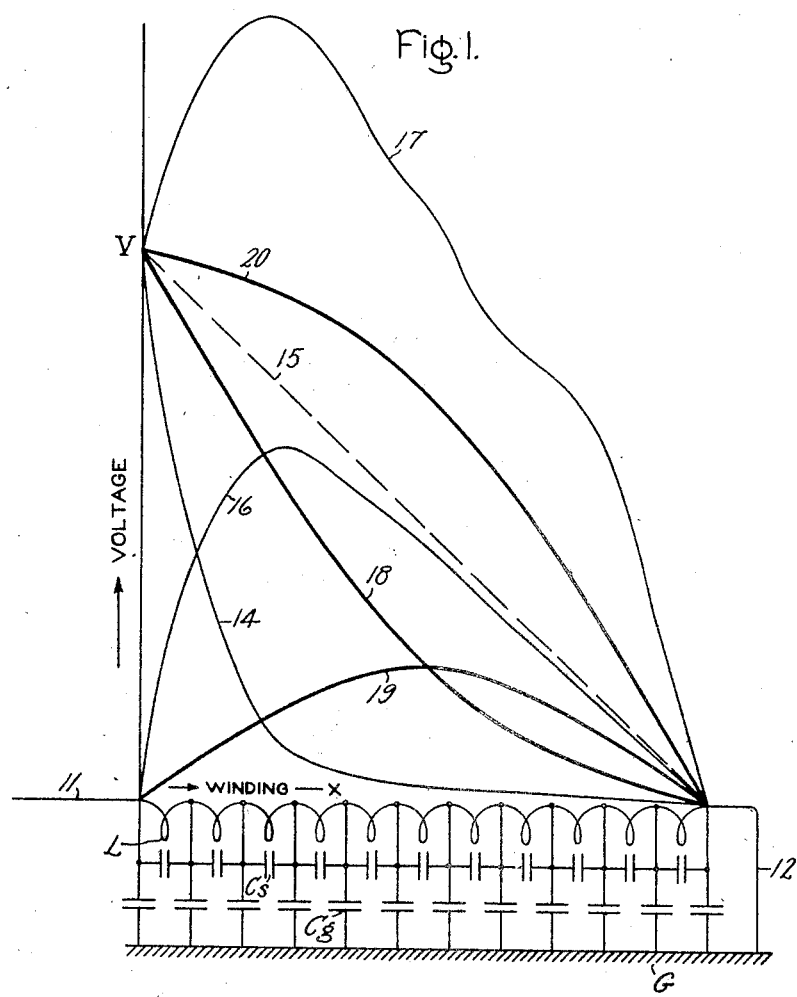

Dec. 15, 1942.   K. K. PALUEV   2,305,357
ELECTRICAL APPARATUS WINDING
Filed April 4, 1940   2 Sheets--Sheet 1

Inventor:
Konstantin K. Paluev,
by Harry E. Dunham
His Attorney.

Inventor:
Konstantin K. Paluev,
by Harry E. Dunham
His Attorney.

Patented Dec. 15, 1942

2,305,357

UNITED STATES PATENT OFFICE 2,305,357

ELECTRICAL APPARATUS WINDING

Konstantin K. Paluev, Pittsfield, Mass., assignor to General Electric Company, a corporation of New York Application April 4, 1940, Serial No. 327,813

18 Claims. (Cl. 178—44)

This invention relates to electrical apparatus windings such as the windings of high-tension transformers and reactors, being a continuation in part of my copending application, Serial No. 222,209, filed July 30, 1938, and assigned to General Electric Company, the assignee of the present application.

It is generally recognized that the primary cause of the electrical breakdown of such windings is the impact of transient electrical waves, such as direct or indirect lightning strokes, switching surges and arcing ground oscillations. Accordingly, the general object of the present invention is to produce a high-tension winding structure, based on a new principle, which will be safe from breakdown under such conditions without the excessive cost which characterizes the prevailing types of high tension windings in the industry.

The impact of abnormal electrical phenomena of the above mentioned type on a winding may be accompanied by one or more of the following three types of stresses within the winding: first, a high voltage gradient, that is, high voltage across a turn or unit element of the winding, stressing particularly the turn and coil insulation of the winding; second, a high potential to ground at some point of the winding, stressing particularly the so-called major insulation of the winding, which is the insulation between pairs of windings or that between a winding and the grounded portions of the transformer; and, third a cumulative oscillation by resonance, resulting in either high gradients, or high potentials, or both. As these phenomena are functions of the distribution of the electrostatic and electromagnetic networks included between the terminals of the winding, efforts to cope with these stresses have heretofore assumed one of two principal forms.

One general scheme is that disclosed by J. M. Weed in United States Letters Patent 1,585,448, issued May 18, 1926, and assigned to the assignee of the present application, covering methods of so adjusting the capacitance network of the winding as to enforce a uniform voltage distribution throughout the winding under all conditions. While this method is wholly rational, it involves generally electrostatic shield constructions considerably more expensive than those required by the present invention.

Another practice has been to ameliorate the transient stresses in the winding by partially shielding the high-tension winding, as by providing electrostatic plates at the two ends of the winding, and then providing a higher insulation level to compensate for the inadequacy of the shielding. The objections to this practice are, first, that while it may reduce the potentials or gradients for long impulses at some points, it may increase the gradient or the potential at some other points; and, second, that the winding is still subject to a plurality of harmonic oscillations and resonance, with even the possibility, in some cases, of more intensified values in some of the harmonics by reason of the shield. Accordingly, in such a transformer with an increased insulation level for safety under the above-mentioned transient phenomena, the insulation is more than likely to be wasteful at some points and of doubtful adequacy at other unsuspected points.

Figure 2:
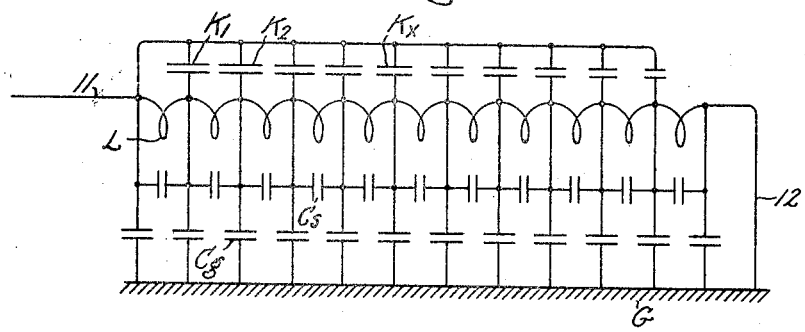
Figure 3:
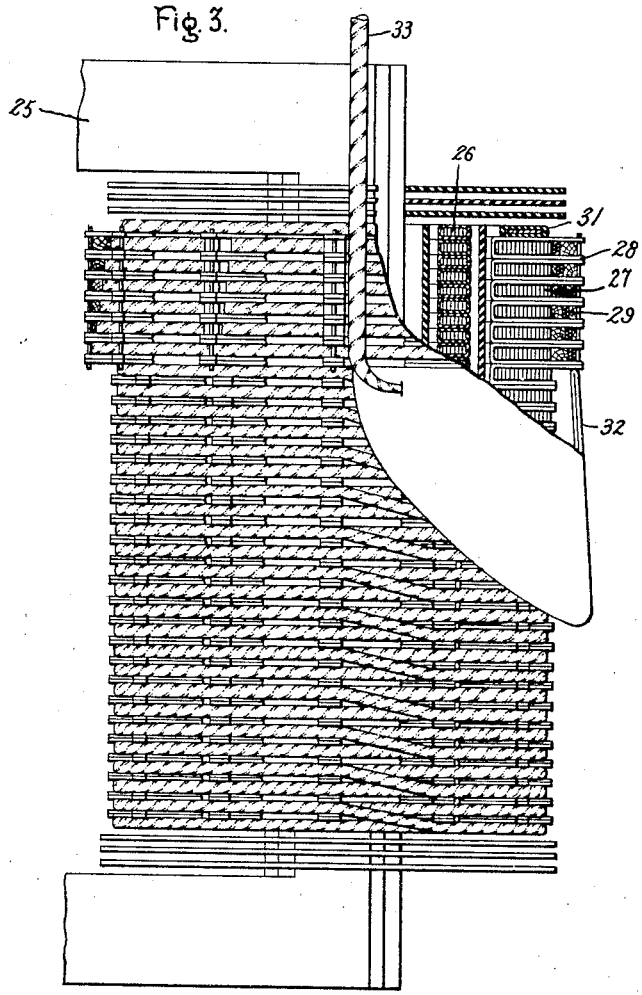
Figure 4:
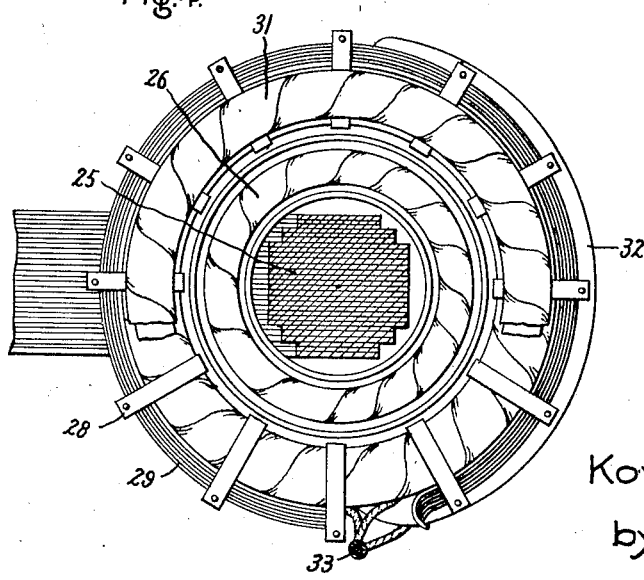

The principle of the invention and the nature of the structure appropriate therefor, together with other objects and benefits of the invention, will be clearly understood from the following description taken in connection with the accompanying drawings which form a part of this specification and in which Fig. 1 shows diagrammatically the equivalent electrical circuit of a conventional winding and certain transient characteristic curves to illustrate the principles underlying the present invention; Fig. 2 shows diagrammatically the equivalent electrical circuit of a winding modified in accordance with the present invention; Fig. 3 is a view, partly in section, of a preferred structure in the form of a winding equipped with an appropriate electrostatic shielding arrangement adapted to secure the equivalent electrical circuit of Fig. 2; and Fig. 4 is a plan view of the winding.

The present invention is based on the discovery by mathematical analysis that the higher harmonic oscillations are more responsible for high gradients, the lowest harmonic oscillation for the major portion of the potential to ground; that by suitable structure the higher harmonic oscillations can be suppressed, leaving only the lowest or fundamental harmonic as the single possible mode of oscillation the amplitude of which can be reduced to a desired value by the same means and thus a number of important benefits are secured simultaneously and the problem of insulation is rendered simple to determine and relatively inexpensive to provide. Thus, (a) the problem of high gradients by resonance is entirely eliminated and the gradients for impulse waves reduced to safe values; (b) possible resonance frequencies are reduced from an indefinitely large number to only one, thereby reducing the probability of resonance proportionately; (c) the internal potentials and gradients of the winding for lightning impulse waves are lowered to a level well within that of normal insulation; and (d) if resonance should take place at the only possible mode of oscillation of the winding (the probability of which, as pointed out above, is negligible compared with the probability of at least one of an indefinitely large number of permitted modes of oscillation getting into resonance), the resulting potential is only one half of what it would be otherwise.

In a preferred embodiment of my invention, I secure the desirable results described above by the simple expedient of an appropriately proportioned electrostatic shield which, under a sheer impulse wave of long duration, produces a sinusoidal distribution of the transient component of voltage within the winding, and my method of shielding may therefore be referred to as sinusoidal shielding, and the winding so shielded as a sinusoidally shielded winding.

The proportioning of the electrostatic shield for sinusoidal shielding, in accordance with the present invention, will now be explained by a more detailed reference to the drawings.

Fig. 1 is a conventional diagrammatic sketch of the equivalent electrostatic and electromagnetic networks of a simple solenoidal winding such as shown in Fig. 3, having its turns or winding elements uniformly distributed between its two terminals 11 and 12, the former ungrounded, the latter grounded; the plurality of similar elements $C_s$ represent the capacitance between adjacent winding elements; the similar elements $C_g$ represent the capacitance between each winding element and the ground; and the similar elements L the effective inductance of each winding element. If a lightning wave of a sheer front having a value V is suddenly impressed on such a winding, the stress is distributed over the winding along a curve similar to 14 and having the equation $$e_x = \frac{\sinh \alpha(1-x)}{\sinh \alpha} \qquad \alpha = \sqrt{C_g C_s} \qquad (1), (2)$$

in which $e_x$ is the potential to ground at a point in the winding at a distance $x$ from the high-tension terminal of the winding, this voltage being expressed as a fraction of the impressed voltage V and $x$ being expressed as a fraction of the length of the winding. The dotted line 15 is the steady-state or uniform-distribution curve, having the equation $$e_x = 1-x \qquad (3)$$

The stress difference between the hyperbolic curve 14 and the straight line 15 is shown as curve 16, which has the equation $$e_x' = 1-x-\frac{\sinh \alpha(1-x)}{\sinh \alpha} \qquad (4)$$

$$= 1-x-\sum e_n \sin (n\pi x) \cos 2\pi f_n t \qquad (5)$$

in which $e_x'$ is the deviation of potential at $x$ from curve 15; $e_n$ is the maximum amplitude, and $f_n$ the frequency of the $n$th harmonic, $n$ assuming the successive values 1, 2, 3, . . .

Equation 5 follows from 4 by the well-known Fourier theorem and represents a compound electrical oscillation comprising a theoretically infinite number of harmonics of different space length and time frequency, with 15 as the axis or zero line for all; the initial values of the harmonic oscillations, combined with curve 15, making up the curve 14.

The initial state of affairs it is seen, causes a high voltage gradient at the high-tension end of the winding as measured by the steepness of the slope of curve 14 at that point; and it is an object of the present invention to reduce such gradients to within the strength of normal transformer insulation.

Some time later, for instance a period corresponding to one-half cycle of the fundamental harmonic of the oscillations, the resultant potential distribution in the winding takes the form of curve 17 which, it will be seen, at some portions of the winding rises much higher than the terminal voltage V; and it is another object of the present invention to remedy this condition by providing means whereby curve 17 may not rise materially above the level of V at any time.

According to the present invention, the equivalent electrostatic network of the winding is so modified that the initial distribution of potential stress takes the form of curve 18 yielding a transient oscillatory curve 19, representing the difference between curves 15 and 18, and which is seen to be a simple sinusoid in accordance with the equation $$e_x' = e_1 \sin \pi x \qquad (6)$$

in which $e_1$ is the maximum amplitude of curve 19.

When this condition is secured, that is, when Equation 6 holds, instead of Equation 5, it becomes possible to secure three benefits simultaneously. (a) The winding has only one possible mode of oscillation instead of an infinite number; that is, all but the lowest mode of the oscillations of the winding are suppressed, and the danger of resonance at any one of the corresponding higher harmonic frequencies eliminated. (b) By making $e_1$, the amplitude of curve 19, equal to 0.32, that is, 32% of the potential V, curve 17 is changed to curve 20 which does not rise above the terminal potential V. I have found by mathematical analysis that 0.32 is the maximum possible value the fundamental harmonic can obtain under a transient wave like V when all the higher harmonics are suppressed. For various practical reasons the major insulation of a winding frequently cannot be graded uniformly from the high tension end toward the grounded end in accordance with the voltage distribution corresponding to curve 15. In such cases there is no advantage obtained in major insulation by making the maximum potential curve to coincide with the theoretical curve 15 instead of 20 whereas curve 20 can be readily secured and by much more economical means than curve 15. (c) Considering the slope of the tangent to curve 18 at the high tension end of the winding, it is seen that this is very much less steep than that of curve 14 of a normal unshielded winding; while the slope of curve 14 is generally in the order of 5 to 10 times that of curve 15, that is, the voltage concentration at the line end of the winding is 5 to 10 times as severe as it would be in uniform voltage distribution, that of curve 18, with $e_1$ of Equation 6 adjusted to its maximum value of 0.32, has still the low value of 2 times that of uniform distribution and is hence well within the strength of normal insulation of a winding.

The modification of the capacitance network of an unshielded uniform winding so as to suppress all but the lowest of its harmonic modes of oscillation and limit its potential and gradient in accordance with the foregoing principles is accomplished by the present invention as follows.

Figure 2 shows the equivalent electrostatic and electromagnetic network of a transformer incorporating a set of dissimilar modifying capacitance elements $K_1, K_2, \ldots, K_x$, etc., connected between the high-tension terminal 11 of the winding and the corresponding winding elements as determined by the subscript of the K. I have found by mathematical analysis that substantially the desired sinusoidal curve 19 will result if the modifying capacitance element $K_x$ effective between the high tension terminal and the winding element at $x$ distance therefrom is proportioned to the previously defined capacitance element $C_x$ by the equation $$\frac{K_x}{C_x} = \frac{1-x-e_1 \sin \pi x}{x+e_1 \sin \pi x} \quad (7)$$

Thus, given the $C_x$ of a specific winding and the desired amplitude $e_1$ of the fundamental harmonic which I prefer to make 0.32, the necessary value of $K_x$ to be connected to the winding element at $x$, is determined by Formula 7.

In Fig. 2, the presence of capacitance elements $C_x$ modifies the effective capacitance between the high-tension terminal 11 and the point $x$ of the winding, as well as the effective capacitance between the point $x$ and ground; so that, theoretically, Formula 7 applies rigorously to these modified or effective values only. However, I find that in all practical cases requiring shielding, this refinement may be ignored, and the more so as the need for shielding becomes greater, that is, as the value of $\alpha$ increases.

In the application of Formula 7, the assumed value of $e_1$ need not be a positive fraction but it may also be negative if desired, thereby reversing the time phase of the harmonic and correspondingly calling for a different distribution of capacitances K. However, in the simple case of Fig. 2, a positive value of $e_1$ leads to a more economical design.

If, in certain applications, such as radio filter circuits, it should be desired to suppress all harmonic oscillations except the $n$th harmonic instead of the fundamental, Formula 7 takes the form $$\frac{K_x}{C_x} = \frac{1-x-e_n \sin n\pi x}{x+e_n \sin n\pi x} \quad (8)$$

which reduces to Formula 7 when for the $n$th harmonic we take the fundamental, that is $n=1$.

In the case of those transformers in which neither terminal is grounded and the windings are intended for Y connection, I find that all of the harmonics except the $n$th will be substantially suppressed by proportioning the capacitance $K_x$ in accordance with the formula $$\frac{K_x}{C_x} = \frac{1-e_n \sin (n\pi x/2)}{e_n \sin (n\pi x/2)} \quad (9)$$

Accordingly, all but the fundamental will be suppressed by setting $n$ in Equation 9 equal to unity.

Finally, if both terminals of the winding are to be isolated and the winding is to be connected in delta, or across a pair of line wires of which the potentials normally correspond to those of two terminals of a delta circuit, I find that in order to provide for the eventuality of the appearance of a disturbing potential at both ends of the winding simultaneously, duplicate sets of modifying capacitance elements K are preferably arranged from each terminal of the winding towards the middle and proportioned in accordance with the formula $$\frac{K_x}{C_x} = \frac{1-e_n \sin n\pi x}{e_n \sin n\pi x} \quad (10)$$

so as to suppress all modes of oscillation except the $n$th which may be made the fundamental by setting $n$ equal to unity.

When an oscillatory voltage distribution is rendered unimodal by modifying the electrostatic network as described above, the capacitance network may not be symmetrical with respect to the two terminals of the winding; and, therefore, as the harmonic oscillation progresses in time, the distribution of the harmonic will not remain strictly sinusoidal theoretically, but will become distorted. However, I have verified by oscillographic studies that this distortion is small and of no practical consequence so far as the primary objectives of the invention are concerned.

While I have described my invention in the foregoing as a winding protective system, it is not so limited in its application and may be adapted to a variety of other uses also. For instance, in high frequency application, if it is desired that a given winding oscillate freely in certain of its frequencies, such as its $i$th, $j$th and $k$th modes, and not in any others, Formulas 8, 9 and 10 are modified respectively to 8a, 9a and 10a as follows:

$$\frac{K_x}{C_x} = \frac{1-x-e_i \sin i\pi x - e_j \sin j\pi x - e_k \sin k\pi x}{x+e_i \sin (i\pi x) + e_j \sin j\pi x + e_k \sin k\pi x} \quad (8a)$$

$$\frac{K_x}{C_x} = \frac{1-e_i \sin (i\pi x/2) - e_j \sin (j\pi x/2) - e_k \sin (k\pi x/2)}{+e_i \sin (i\pi x/2) + e_j \sin (j\pi x/2) + e_k \sin (k\pi x/2)} \quad (9a)$$

$$\frac{K_x}{C_x} = \frac{1-e_i \sin i\pi x - e_j \sin j\pi x - e_k \sin k\pi x}{+e_i \sin i\pi x + e_j \sin j\pi x + e_k \sin k\pi x} \quad (10a)$$

Thus the general applicability of the principles and formulas of the invention to windings for securing any desired number of particular harmonics and for suppressing all others is evident.

The capacitance elements $K_1, K_2, \ldots, K_x$, etc., may be individual external capacitors or condensers; or, they may be individual conductors of a suitable shape, such as those commonly known as rib shields, connected to the line terminal and insulated from, and placed in proximity to the corresponding winding element to provide the desired capacitance $K_x$ between itself and that winding element at $x$ by the formula $$\frac{AB_x}{D_x} = \frac{K_x}{k} \quad (11)$$

in which A is the mean axial width of a winding element and its rib shield, $B_x$ is the circumferential length of a rib shield, $D_x$ is the effective distance between the conductive surfaces of the winding element and that of the rib shield, and $k$ is the effective dielectric constant of the insulation between the winding element and its shield.

The various rib shields may be substituted by one continuous plate, tapered in width (dimension corresponding to $B_x$) and in its spacing with respect to the winding elements (dimension corresponding to $D_x$) in any manner convenient to secure the desired effective ratio $B_x/D_x$.

It is also obvious that many combinations of rib and plate shields may be designed to give the desired results. In Fig. 3 is illustrated a specific example of such a combination. The winding in this case is that of a transformer which includes a magnetic core 25 having arranged upon a leg thereof a low voltage winding 26 and a high voltage winding 27. The high voltage winding, with which we are here concerned, is formed of a stack of spaced annular or disk coils which are maintained in a spaced relation by U-shaped spacing strips 28 extending radially between the coils. The shielding structure comprises a group of insulated conductive strips or rib shields 29 disposed along the outer edges of corresponding winding coils nearest the high voltage terminal thereof, an insulated annular static line plate 31 provided over the terminal coil, and an insulated tapered plate 32 extending downwardly over a portion of the winding stack below the rib shields 29. The shielding members are all connected to the high potential lead indicated at 33 as is an end turn of the top coil of the winding stack. It is obvious that none of the shielding members extend entirely around the core so as to constitute short circuit turns. The specific dimensions of each element of the shielding structure, that is, the length, width and spacing from the adjacent coil is determined in accordance with Formula 11 to provide the desired capacitance between such element and the coil. Since the winding is assumed to be grounded in this instance the required capacitance values are calculated according to Formula 7. The capacitance value will be greatest for the winding element nearest the line terminal so that the first rib shield will be arranged relatively closely adjacent thereto. The capacitance values for the successive winding elements will be progressively less and the corresponding rib shields are accordingly spaced at progressively greater distances therefrom. While rib shields may be used throughout, greater economy favors the use of a plate shield for supplying the lesser values of capacitance to the winding elements following the first few coils of the stack. At such portion of the winding, the plate can be spaced relatively far from the coil stack so that it will not interfere seriously with the circulation of oil between the coils. From an inspection of the formulas and as indicated by the relatively flat slope of the lower end of curve 18 it will be seen that the capacitance values for last 30 to 40 per cent of the winding will be very small and which capacitance can be adequately provided by the edge effect from the lower portion of the plate 32 which accordingly may be terminated at an appropriate point corresponding to about 60 to 70 per cent of the winding.

Thus it is apparent that the invention provides a very simple and inexpensive arrangement for controlling the oscillations of a winding subjected to a suddenly impressed voltage. Applied as a protective means to a high potential winding of a transformer, harmonic oscillations likely to produce high potential gradients may be effectively eliminated while the transient wave is distributed over the winding at a level well within that of the normal insulation.

While I have described my invention in the foregoing, for clarity of exposition and convenience of utilization as embodied in certain highly useful applications and preferred structures, various modifications thereof will be evident to those skilled in the art, and my invention includes also all such modifications as fall within its true spirit and the scope of the following claims.

What I claim as new and desire to secure by Letters Patent of the United States is:

1. The combination with a winding of electrical induction apparatus including a terminal and having distributed shunt capacitance to ground, of means for effecting a predetermined distribution of a suddenly impressed voltage wave over said winding, said means comprising a plurality of capacitors connected in parallel between said terminal and successive winding elements adjacent thereto, said capacitors being so graded as to limit the oscillations of said winding to the fundamental harmonic.

2. The combination with a winding of electrical induction apparatus having distributed shunt capacitance to ground, of means for distributing a voltage suddenly impressed upon a terminal thereof, said means comprising an electrostatic shield connected to said terminal and electrostatically coupled with said winding, the capacitance between said shield and successive elements of said winding being such that the oscillations of said winding when subjected to a transient voltage wave are limited to the lowest harmonic.

3. The combination with an electrical winding having a terminal and distributed shunt capacitance to ground of means for limiting the magnitude of potential gradients which may occur across adjacent elements of said winding upon a voltage wave being suddenly impressed upon said terminal, said means comprising a capacitance element connected to said terminal and electrostatically coupled with said winding, the capacitance between said element and consecutive portions of said winding being such that only a predetermined portion of the shunt capacitance to ground from said winding portions is neutralized to cause only the suppression of high harmonic oscillations in said winding, while other frequencies are permitted to oscillate in said winding.

4. The combination with an electrical winding having a terminal, of means for limiting the number of resonance frequencies of said winding when said winding is subjected to a voltage wave suddenly applied to said terminal, said means comprising an electrostatic shield disposed adjacent said winding and connected to said terminal, the effective capacitance between said shield and the adjacent winding elements being so proportioned that predetermined harmonic frequencies are substantially suppressed while other harmonic frequencies are permitted to oscillate in said winding.

5. The combination with an electrical winding having a terminal and distributed shunt capacitance to ground of means for effecting a distribution of a voltage suddenly impressed upon said terminal over said winding, said means comprising electrostatic means electrostatically coupled with said winding, the capacitance between said electrostatic means and the respective elements of said winding being such that the suddenly applied voltage is distributed over said winding sinusoidally with respect to the final voltage distribution determined by the electromagnetic network of the winding.

6. The combination with an electrical winding of means for modifying the capacity network of said winding so as to control only a predetermined limited number of oscillations thereof, said means comprising a capacitance arrangement effectively connected between a first terminal of said winding and the respective elements thereof distributed from said first terminal toward a second terminal, the effective capacitance through said arrangement to each winding element being so proportioned relative to the capacitance to ground from each such element whereby said predetermined oscillations of said winding are substantially suppressed, while harmonic frequencies other than said predetermined limited number are permitted to oscillate in said winding.

7. The combination with an electrical winding of means for modifying the oscillatory network between the terminals of the winding to distribute a voltage suddenly applied to a terminal thereof substantially sinusoidally through the winding, said means comprising a capacitance element connected to said terminal and electrostatically coupled with said winding so that the ratio of capacitance from said element to any point on said winding with respect to the capacitance from said point to ground is substantially $$\frac{1-x-e_1 \sin \pi x}{x+e_1 \sin \pi x}$$

in which $x$ is the distance of said point of the winding from said terminal thereof, and $e_1$ is an arbitrary constant less than 1.

8. The combination with an electrical winding having distributed shunt capacitance to ground, of means for modifying the oscillatory network between the terminals of the winding to distribute a voltage wave suddenly applied to one terminal substantially sinusoidally through the winding, a capacitance element connected to said one terminal and arranged adjacent said winding, said element being so proportioned and positioned relative to said winding that the ratio of the capacitance between said element and any point on said winding with respect to the shunt capacitance from said point to ground is substantially equal to $$\frac{1-x-e_1 \sin \pi x}{x+e_1 \sin \pi x}$$

in which $x$ is the distance of said point of the winding from said one terminal and $e_1$ is a constant substantially equal to 0.32.

9. In combination with an electrical winding having a terminal and distributed shunt capacitance to ground of means for suppressing all harmonic oscillations in said winding except the $n$th harmonic to distribute a voltage suddenly applied to said terminal over said winding, said means comprising conductive means connected to said terminal and electrostatically coupled with said winding, said conductive means being so proportioned and arranged with relation to said winding that the ratio of the capacitance between said conductive means and any point on said winding with respect to the shunt capacitance to ground from said point is substantially equal to $$\frac{1-x-e_n \sin n\pi x}{x+e_n \sin n\pi x}$$

in which $x$ is the distance of said point of the winding from said terminal, $n$ is the selected harmonic, and $e_n$ is the maximum amplitude of the harmonic $n$ expressed as a fraction of the impressed voltage.

10. The combination of an electrical winding having a terminal, of means for distributing over said winding a voltage suddenly applied to said terminal, said means comprising a capacitance element, a connection between said capacitance element and said terminal, said capacitance element being electrostatically associated with successive portions of said winding extending from said terminal, the capacitance from said element to the different of said winding portions being such that the maximum amplitude of oscillations of said winding following the application of said suddenly applied voltage is limited to a value of the order of 32 per cent of the value of said suddenly applied voltage.

11. The combination with an electrical winding having a terminal, said winding having distributed shunt capacitance to ground, of means for effecting a predetermined non-uniform distribution of a suddenly impressed voltage wave over said winding, said means comprising a plurality of capacitance elements connected in parallel between said terminal and successive winding elements adjacent thereto, said capacitance elements being so graded as to limit the oscillations of said winding following the application of said suddenly impressed voltage wave to a maximum value of substantially 32 per cent of the value of said suddenly impressed voltage wave.

12. The combination with an electrical winding having a terminal, of means for effecting a predetermined non-uniform distribution of a suddenly impressed voltage wave over said winding, said means comprising a plurality of capacitors connected in parallel between said terminal and successive winding elements adjacent thereto, said capacitors being so graded as to effect such a distribution of the suddenly impressed voltage wave over said winding that the difference between the initial and final voltage distribution is a transient oscillatory curve of substantially sinusoidal character.

13. The combination with an electrical winding having a terminal and having distributed shunt capacitance to ground, of means for effecting a predetermined distribution of a suddenly impressed voltage wave over said winding, said means comprising an electrostatic shield connected to said terminal and arranged adjacent said winding, the capacitance between said shield and the successive elements of said winding being so graded that following the initial application of said voltage wave the winding will oscillate only at a fundamental frequency having such a maximum value that the total voltage permitted to occur at any point in said winding is substantially limited to the initial value of said voltage wave.

14. In combination with an electrical winding having a terminal and distributed shunt capacitance to ground of means for suppressing all harmonic oscillations in said winding except the $n$th harmonic to distribute a voltage suddenly applied to said terminal over said winding, said means comprising conductive means connected to said terminal and electrostatically coupled with said winding, said conductive means being so proportioned and arranged with relation to said winding that the ratio of the capacitance between said conductive means and a point on said winding with respect to the shunt capacitance to ground from said point is substantially equal to $$\frac{1-e_n \sin (n\pi x/2)}{e_n \sin (n\pi x/2)}$$

in which $x$ is the distance of said point of the winding from said terminal, $n$ is the selected harmonic, and $e_n$ is the maximum amplitude of the harmonic $n$ expressed as a fraction of the impressed voltage.

15. In combination with an electrical winding having a terminal and distributed shunt capacitance to ground of means for suppressing all harmonic oscillations in said winding except the $n$th harmonic to distribute a voltage suddenly applied to said terminal over said winding, said means comprising conductive means connected to said terminal and electrostatically coupled with said winding, said conductive means being so proportioned and arranged with relation to said winding that the ratio of the capacitance between said conductive means and a point on said winding, with respect to the shunt capacitance to ground from said point is substantially equal to $$\frac{1-e_n \sin n\pi x}{e_n \sin n\pi x}$$

in which $x$ is the distance of said point of the winding from said terminal, $n$ is the selected harmonic, and $e_n$ is the maximum amplitude of the harmonic $n$ expressed as a fraction of the impressed voltage.

16. In combination with an electrical winding having a terminal and distributed shunt capacitance to ground of means for suppressing all harmonic oscillations in said winding except the $i$th, $j$th, and $k$th harmonics to distribute a voltage suddenly applied to said terminal over said winding, said means comprising conductive means connected to said terminal and electrostatically coupled with said winding, said conductive means being so proportioned and arranged with relation to said winding that the ratio of the capacitance between said conductive means and a point on said winding with respect to the shunt capacitance to ground from said point is substantially equal to $$\frac{1-x-e_i \sin i\pi x-e_j \sin j\pi x-e_k \sin k\pi x}{x+e_i \sin i\pi x+e_j \sin j\pi x+e_k \sin k\pi x}$$

in which $x$ is the distance of said point of the winding from said terminal, $i$, $j$, and $k$ are the selected harmonics, and $e_i$, $e_j$, and $e_k$ are the maximum amplitudes of the harmonics $i$, $j$, and $k$, respectively, expressed as fractions of the impressed voltage.

17. In combination with an electrical winding having a terminal and distributed shunt capacitance to ground of means for suppressing all harmonic oscillations in said winding except the $i$th, $j$th, and $k$th harmonics to distribute a voltage suddenly applied to said terminal over said winding, said means comprising conductive means connected to said terminal and electrostatically coupled with said winding, said conductive means being so proportioned and arranged with relation to said winding that the ratio of the capacitance between said conductive means and a point on said winding with respect to the shunt capacitance to ground from said point is substantially equal to $$\frac{1-e_i \sin (i\pi x/2)-e_j \sin (j\pi x/2)-e_k \sin (k\pi x/2)}{+e_i \sin (i\pi x/2)+e_j \sin (j\pi x/2)+e_k \sin (k\pi x/2)}$$

in which $x$ is the distance of said point of winding from said terminal, $i$, $j$, and $k$ are the selected harmonics, and $e_i$, $e_j$, and $e_k$ are the amplitudes of the harmonics $i$, $j$, and $k$, respectively, expressed as fractions of the impressed voltage.

18. In combination with an electrical winding having a terminal and distributed shunt capacitance to ground of means for suppressing all harmonic oscillations in said winding except the $i$th, $j$th, and $k$th harmonics to distribute a voltage suddenly applied to said terminal over said winding, said means comprising conductive means connected to said terminal and electrostatically coupled with said winding, said conductive means being so proportioned and arranged with relation to said winding that the ratio of the capacitance between said conductive means and a point on said winding with respect to the shunt capacitance to ground from said point is substantially equal to $$\frac{1-e_i \sin i\pi x-e_j \sin j\pi x-e_k \sin k\pi x}{+e_i \sin i\pi x+e_j \sin j\pi x+e_k \sin k\pi x}$$

in which $x$ is the distance of said point of the winding from said terminal, $i$, $j$, and $k$ are the selected harmonics, and $e_i$, $e_j$, and $e_k$ are the maximum amplitudes of the harmonics $i$, $j$, and $k$, respectively, expressed as fractions of the impressed voltage.

KONSTANTIN K. PALUEV.

Certificate of Correction

Patent No. 2,305,357.  December 15, 1942.

KONSTANTIN K. PALUEV

It is hereby certified that errors appear in the printed specification of the above numbered patent requiring correction as follows: Page 2, first column, line 43, for $$\alpha = \sqrt{C_t C_s} \text{ read } \alpha = \sqrt{C_t/C_s}$$

page 4, first column, line 45, for the words "for last" read *for the last*; page 6, second column, line 14, claim 17, after "point of" insert *the*; and that the said Letters Patent should be read with these corrections therein that the same may conform to the record of the case in the Patent Office.

Signed and sealed this 9th day of February, A. D. 1943.

[SEAL]

HENRY VAN ARSDALE,
*Acting Commissioner of Patents.*